(12) United States Patent
Shen et al.

(10) Patent No.: US 11,200,577 B2
(45) Date of Patent: Dec. 14, 2021

(54) CONVOLUTIONAL NEURAL NETWORKS FOR VARIABLE PREDICTION USING RAW DATA

(71) Applicant: PayPal, Inc., San Jose, CA (US)

(72) Inventors: Shiwen Shen, Los Angeles, CA (US); Danielle Zhu, Millbrae, CA (US); Feng Pan, Los Altos, CA (US)

(73) Assignee: PayPal, Inc.

( * ) Notice: Subject to any disclaimer, the term of this patent is extended or adjusted under 35 U.S.C. 154(b) by 1009 days.

(21) Appl. No.: 15/692,481

(22) Filed: Aug. 31, 2017

(65) Prior Publication Data

US 2019/0066110 A1    Feb. 28, 2019

(51) Int. Cl.
| | |
|---|---|
| G06N 3/04 | (2006.01) |
| G06Q 20/40 | (2012.01) |
| G06Q 20/38 | (2012.01) |
| G06Q 30/02 | (2012.01) |
| G06K 9/62 | (2006.01) |
| G06N 3/08 | (2006.01) |
| G06F 17/18 | (2006.01) |
| G06F 17/15 | (2006.01) |

(52) U.S. Cl.
CPC ....... *G06Q 20/4016* (2013.01); *G06K 9/6256* (2013.01); *G06K 9/6271* (2013.01); *G06N 3/0454* (2013.01); *G06N 3/082* (2013.01); *G06Q 20/382* (2013.01); *G06Q 30/0201* (2013.01); *G06F 17/15* (2013.01); *G06F 17/18* (2013.01); *G06N 3/04* (2013.01); *G06Q 20/389* (2013.01); *G06Q 30/0206* (2013.01)

(58) Field of Classification Search
None
See application file for complete search history.

(56) References Cited

U.S. PATENT DOCUMENTS

| | | |
|---|---|---|
| 5,182,794 A | 1/1993 | Gasperi et al. |
| 2003/0120899 A1 | 7/2003 | Ferguson et al. |
| 2013/0282635 A1 | 10/2013 | Dull et al. |
| 2016/0117609 A1 | 4/2016 | Billingsley et al. |
| 2017/0061281 A1 | 3/2017 | Gokmen et al. |

OTHER PUBLICATIONS

Hayder, Deep Structured Models for Large Scale Object Co-detection and Segmentation, Doctor of Philosophy, The Australian National University, Jul. 2017, pp. 1-178 (Year: 2017).*

(Continued)

*Primary Examiner* — Wilbert L Starks
(74) *Attorney, Agent, or Firm* — Haynes and Boone, LLP

(57) ABSTRACT

While artificial neural networks can be used to predict particular values in certain contexts, convolutional neural networks are not typically used in these contexts—instead they may be employed for image recognition. However, raw transactional data may be structured to take advantage of convolutional neural network (CNN) techniques by arranging the data such that correlations are increased between nearby other data. In arranging data in this manner, the structured CNN (SCNN) can operate efficiently without having to make use of engineered data features, the generation and maintenance of which can be a time-consuming process.

20 Claims, 10 Drawing Sheets

(56) References Cited

OTHER PUBLICATIONS

IBM, IBM Content Manager OnDemand Guide, Fifth Edition, International Business Machines Corporation, International Technical Support Organization, 2015, pp. 1-440 (Year: 2015).*

Milkau, et al., Active Management of Operational Riskin the Regimes of the "Unknown": What Can Machine Learning or Heuristics Deliver?, Risks 2018, 6, 41, 2018, pp. 1-16 (Year: 2018).*

Unknown "How to Convolutional Neural Networks work?" [Online] [retrieved on Aug. 26, 2017]. Retrieved from the Internet: <URL: https://brohrer.github.io/how_convolutional_neural_networks_work.html>.

Huang, Gao, et al. "Densely Connected Convolutional Networks" [Online] [retrieved on Aug. 1, 2017]. Retrieved from the Internet: <URL: https://arxiv.org/abs/1608.06993v3>, Dec. 2, 2016.

Unknown "A Guide to TF Layers: Building a Convolutional Neural Network" [Online] [retrieved on Aug. 23, 2017]. Retrieved from the Internet: <URL: https://www.tensorflow.org/versions/master/tutorials/layers>.

Unknown "Multi-Layer Neural Network" [Online] Unsupervised Feature Learning and Deep Learning Tutorial [retrieved on Aug. 21, 2017]. Retrieved from the Internet: <URL: http://ufldl.stanford.edu/tutorial/supervised/MultiLayerNeuralNetworks/>.

\* cited by examiner

| Event ID | Account ID | Country | IP Address | Txn Amt | Send / Receive | Fee Costs | Merchant Fee Charged |
|---|---|---|---|---|---|---|---|
| 79874654 | 1234 | US | 173.0.88.2 | $5.48 | Sent | $0.08 | $0.29 |
| 34523589 | 5678 | CN | 172.217.11.228 | $89.98 | Sent | $0.33 | $2.70 |
| 56345421 | 7890 | IT | 128.42.206.11 | $2.00 | Rec'd | $0.00 | $0.00 |
| 98234771 | 5678 | CN | 104.20.84.19 | $323.42 | Sent | $2.50 | $8.93 |
| 202 | 204 | 206 | 208 | 210 | 211 | 212 | 214 |

Sample Records 200

FIG. 2

CONVOLUTIONAL NEURAL NETWORKS FOR VARIABLE PREDICTION USING RAW DATA

TECHNICAL FIELD

This disclosure includes techniques relating to advanced artificial intelligence techniques. Particularly, this disclosure describes methods, systems, and techniques for densely connected neural networks, multi-variable modeling including sub-variable modeling in a unified model, and convolutional neural network techniques usable with raw transactional data.

BACKGROUND

Modern data modeling is a complicated enterprise, especially in big data environments. Particularly in systems with a large number of users, it can be useful to accurately predict future user behavior and the outcomes of this behavior. System and enterprise resources can be allocated to better effect if appropriate planning can be done based on model predictions.

While existing modeling techniques can be used to predict user behavior and its outcomes, such models can often be improved. With more effective modeling techniques, better predictions of user behavior—particularly in transactional systems—can lead to increased productivity and utilization of computing resources. Machine learning techniques, for example, are not always well optimized. Machine learning and artificial intelligence improvements can therefore lead to significant results in outcomes within transactional or other systems.

BRIEF DESCRIPTION OF THE DRAWINGS

FIG. 2 illustrates a block diagram of a set of data records, according to some embodiments.

DETAILED DESCRIPTION

Figure 1:
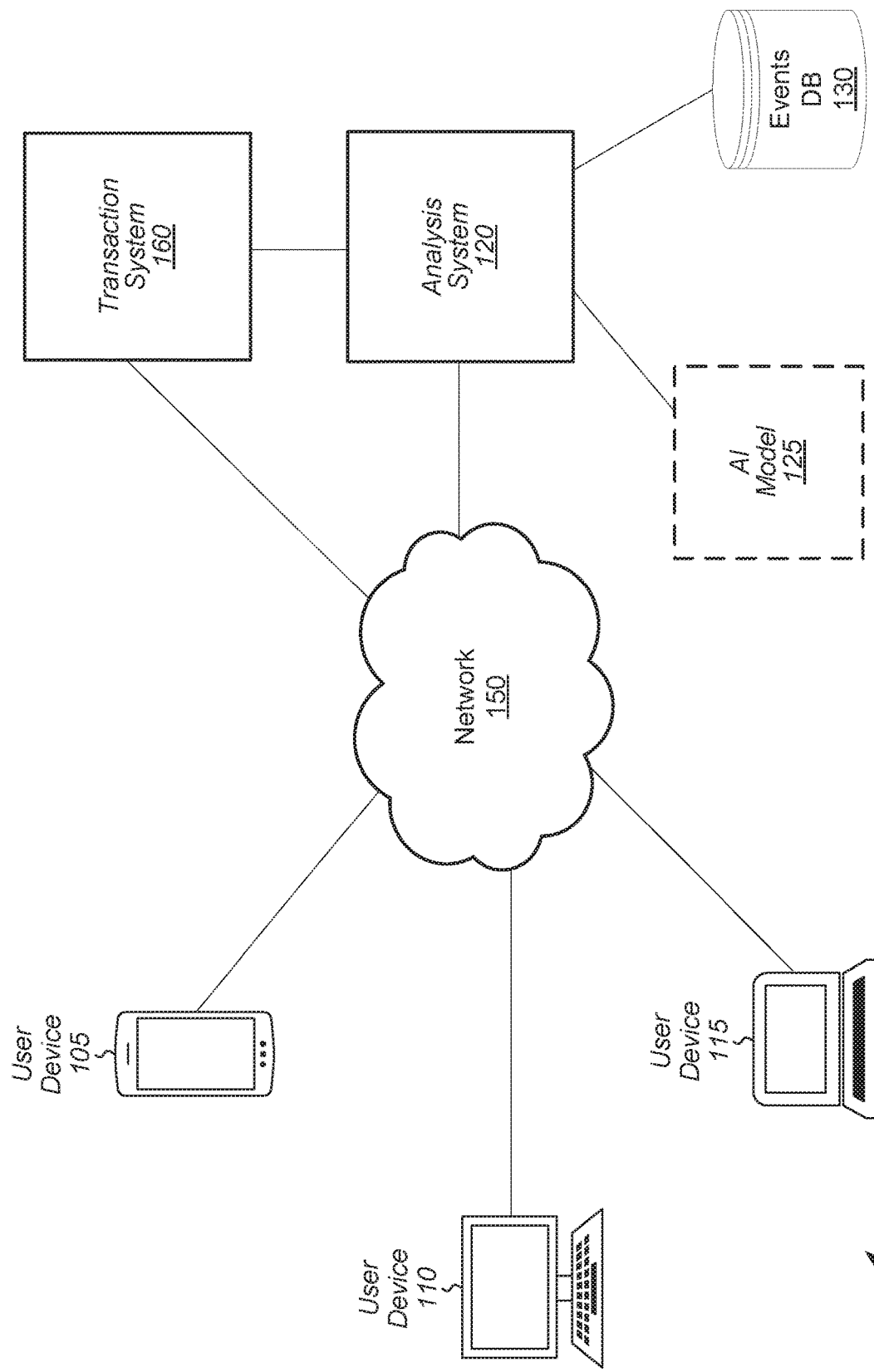
FIG. 1 illustrates a block diagram of a system that includes users' devices, an analysis system, a transaction system, a network, and an events database according to some embodiments.

The present specification allows for the use of densely connected neural networks featuring output forwarding to multiple network layers. A unified artificial intelligence model for predicting customer value and multiple sub-variables is also described. And a convolutional neural network for variable prediction (such as CV) using raw data is further detailed below. These techniques and structures represent improvements in the field of machine learning and artificial intelligence, and produce more robust and accurate models than other prior modeling attempts.

Electronic payment transaction service providers often have large user bases, and each user of the service may act differently. These users conduct greater or lesser numbers transactions, in different amounts, and of different types (e.g. balance transfers, credit card funded transactions, bank automated clearing house (ACH) funded transactions, gift card funded transactions, buying goods or services from a merchant, paying bills, transferring currency or other quantities such as reward points to friends and families, etc.). Because of this varying behavior, different customers of a service provider each may contribute a different amount of net profit or net loss to the service provider.

One scheme for determining the value of a given customer involves calculating four quantities for that customer: cost to a service provider, (other) loss to a service provider, revenue derived by the service provider from the user sending currency (or other quantities), and revenue derived by the service provider from the user receiving currency (or other quantities). Note generally that many examples in this disclosure focus specifically on monetary currency, but the disclosure is not limited as such. Other scenarios involving cryptocurrency, airline reward points, etc., are contemplated and within the scope of this disclosure.

Cost to a service provider may include fees paid out by the service provider in order to effectuate a transaction. This can include fees to a credit card network, fees to an acquiring bank, etc. In some instances, cost to the service provider may also include overhead, regulatory, or other costs. Loss to a service provider may include losses incurred due to fraud or insufficient funds (e.g., a user makes a $100 ACH transaction but the user's bank later denies the ACH for insufficient funds—however, if a service provider has already moved this money to another account or the money has otherwise left the service provider's system, the service provider may incur a partial or total loss for this money).

Revenue derived by the service provider from the user receiving currency (which may be referred to as Rev_R) can include revenue paid to the service provider for a transaction where the user is a receiver. For example, user A may transfer $50 to user B using her credit card as a funding instrument. A service provider such as PayPal™ might charge user A 2.9% for this service (a total of $1.45). In this example, Rev_R for user B would be $1.45—the amount received by PayPal™ for the transaction in which user B was the receiver. Similarly, revenue derived by a service provider from a user sending currency (which may be referred to as Rev_S) can include revenue paid to the service provider for a transaction where the user is a sender. In the example above, Rev_S for user A would be $1.45.

Thus, in one scheme, the total value for a customer (which may be referred to as CV) can be calculated by the formula CV=Cost+Loss+Rev_R+Rev_S. Using historical data such as past transaction data, a customer's previous CV can be determined (e.g., from existing data, the CV for a customer over a previous period of time such as the last 6 or 12 months can be calculated).

Customer CV can be a useful metric in several contexts. When assessing the risk of a transaction, for example, customer CV can be used as one factor in determining whether to approve a transaction. A service provider may see a transaction that appears to be fairly high risk (chance of fraud or NSF), for example. If the customer making that transaction is a relatively high CV customer, the service provider can decide to accept the higher risk and approve the transaction. If the transaction is denied, the high CV customer might choose to take his or her business elsewhere—and thus, even if the potential for loss on the transaction is higher than the service provider would normally accept, it may make sense to take the risk. Conversely, risk thresholds may be lowered for a low CV customer. If a particular customer is only marginally profitable (or is perhaps even unprofitable), a service provider can adopt stricter risk thresholds. Thus, CV can be a data point for risk assessment. Another use of CV is in the area of customer service, where a high CV customer in need of help could be routed with higher priority to a customer service agent or other resource.

Predicting future CV for a user can also be valuable. In some cases, future CV could be calculated from past behavior—e.g. if a user had an average annual CV of $135 for the last 5 years, he may be likely to have a similar CV for the next 12 month period of the future. Using advanced artificial intelligence techniques, however, future CV can be more accurately predicted—and can also be predicted even for users with little or no transactional history (e.g. new users). Such advanced techniques are described below.

Densely connected neural networks may be used in some instances to calculate CV or another quantity. A unified model architecture (which may or may not make use of a densely connected neural network) can also be used to predict not only CV, but also sub-components of CV. Additionally, a structured convolutional neural network can be used to predict CV or another quantity using raw data (rather than engineered data) in various embodiments. A joint unified model is also capable of calculating CV and its component values while making use of both a densely connected neural network (that may operate on engineered data) and also a structured convolutional neural network.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Turning to FIG. 1, a block diagram of a system 100 is shown. In this diagram, system 100 includes user devices 105, 110, 115, an analysis system 120, a transaction system 160, a network 150, and an AI (artificial intelligence) model 125. Also depicted is events DB (database) 130. Note that other permutations of this figure are contemplated (as with all figures). While certain connections are shown (e.g. data link connections) between different components, in various embodiments, additional connections and/or components may exist that are not depicted. Further, components may be combined with one other and/or separated into one or more systems.

User devices 105, 110, and 115 may be any type of computing system. Thus, these devices can be a smartphone, laptop computer, desktop computer, tablet computer, etc. As discussed below, user devices such as 105, 110, and 115 may engage in various actions, including transactions, using transaction system 160. Analysis system 120 may comprise one or more computing devices each having a processor and a memory, as may transaction system 160. Network 150 may comprise all or a portion of the Internet.

In various embodiments, analysis system 120 can take operations related to creating and/or using artificial intelligence to assign a cluster identity to a new event. Note that different aspects of operations described relative to analysis system 120 (as well as other systems described herein) can be performed by two or more different computer systems in some embodiments. Analysis system 120 may be controlled by an entity who provides an electronically provided service, which may be an electronic transaction payment service in some instances (allowing for transfer of currency or other items).

Transaction system 160 may correspond to an electronic payment service such as that provided by PayPal™. Thus, transaction system 160 may have a variety of associated user accounts allowing users to make payments electronically and to receive payments electronically. A user account may have a variety of associated funding mechanisms (e.g. a linked bank account, a credit card, etc.) and may also maintain a currency balance in the electronic payment account. A number of possible different funding sources can be used to provide a source of funds (credit, checking, balance, etc.). User devices 105, 110, and 115 can be used to access electronic payment accounts such as those provided by PayPal™.

Events database (DB) 130 includes records of various actions taken by users of transaction system 160. These records can include any number of details, such as any information related to a transaction or to an action taken by a user on a web page or an application installed on a computing device (e.g., the PayPal app on a smartphone). Many or all of the records in events database 130 are transaction records including details of a user sending or receiving currency (or some other quantity, such as credit card award points, cryptocurrency, etc.). in various embodiments.

Artificial intelligence (AI) model 125 is constructed and/or implemented by analysis system 120 in various embodiments. Thus, AI model 125 may be implemented as one or more data structures and programming logic stored and/or managed by analysis system 120 in a number of different embodiments. As discussed below, AI model 125 may be used to perform a variety of different operations relating to particular machine learning techniques.

Turning to FIG. 2, a block diagram is shown of one embodiment of sample records 200. This diagram is just one example of some of the types of data that can be maintained regarding electronic payment transactions engaged in by a user, and these records may be contained in events database 130.

Information maintained in events database 130, and/or other databases, can be used to calculate costs, other losses, and revenues associated with a particular user. Different users of an electronic payment transaction service provider may use the service in different ways, for example, varying by frequency, amounts, and the types of transactions they perform. Thus, different users may have different amounts of net profit (or loss) that they generate for a service provider. One user may generate a net profit of $200 in a year for a company, while another user might cause a net loss of $25.

As shown, field 202 includes an event ID. This may be a globally unique event identifier within an enterprise associated with transaction system 160. Thus, in one embodiment, the event ID in field 202 includes a unique ID for each of millions of electronic payment transactions processed by a service provider such as PayPal™.

Field 204 includes a unique account ID for a user. Field 206 includes a country code for the user (e.g., US=United States, CA=Canada, etc.).

Fields 208 and 210 represent an IP address date and a transaction amount (which may be specified in a particular currency such as US Dollars, Great Britain Pounds, etc.). The IP address might be the IP address of the user at the time the transaction was conducted, for example. Field 211 indicates whether a particular transaction was money sent or money received (e.g., row 1 for event ID 798744654 shows that the user with account ID 1234 sent an amount of $5.48, while row 3 for event ID 563454210 shows that the user with account ID 7890 received an amount of $2.00).

Field 212 represents a summary of fee costs associated with a transaction. This may be a total of all fees, for example, that are paid out to other parties by an electronic payment transaction service provider such as PayPal™ to effectuate a transaction. These fees may include interchange fees, card network assessment fees, etc.

Field 214 includes a merchant fee charged, e.g., an amount received by an electronic payment transaction service provider. For example, a merchant may charge a customer $100.00 for an item, but will pay a discount fee of $3.50 to a service provider for processing the payment. Thus, field 214 represents an example of revenue received from a transaction.

Information such as that contained in fields 212 and 214 can be used to help calculate certain quantities for a user, such as cost, loss, Rev_R, and Rev_S. Note that in various embodiments, such information may be obtained or calculated from one or more databases associated with transaction system 160.

Also, many additional pieces of information may be present in events database 130 in various embodiments. An email address associated with an account (e.g. which can be used by users to direct an electronic payment to an account using only that account's associated email address) can be listed. Home address, phone number, and any number of other personal details can be listed. A transaction timestamp (e.g. date, time, hour, minute, second) is provided in various embodiments.

Figure 3:
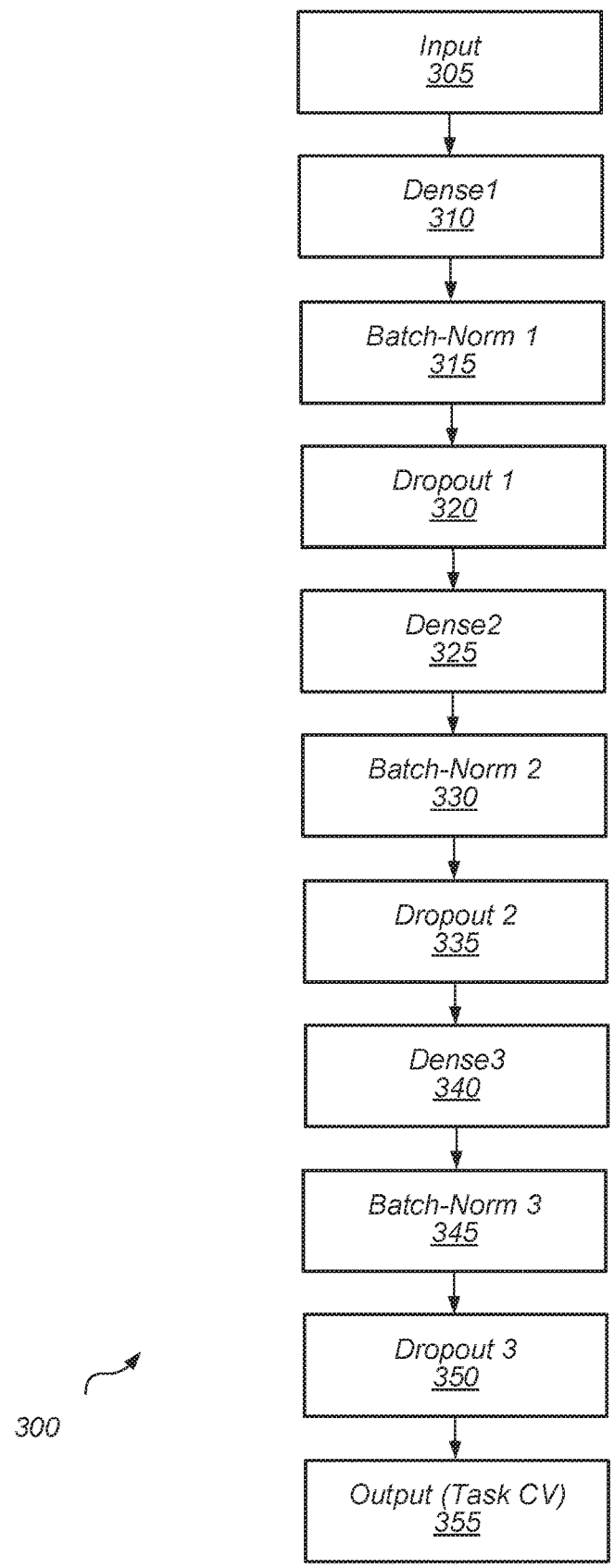
FIG. 3 illustrates a flow diagram of a method that relates to an artificial intelligence network for calculating a value according to some embodiments.

Turning now to FIG. 3, a diagram 300 is shown illustrating one embodiment of an artificial intelligence model for calculating a particular value. In this case, the value being calculated is customer value (CV).

In the embodiment of FIG. 3, a three-phase neural network is used to calculate CV. Unlike the embodiment of FIG. 4, discussed below, this embodiment is not a densely connected neural network.

As depicted, each of the three phases includes a dense layer, a batch normalization layer, and a dropout layer (indicated as 1, 2, and 3). Thus, the first phase includes dense layer 310, batch normalization layer 315, and dropout layer 320. The second phase includes dense layer 325, batch normalization layer 330, and dropout layer 335. The third phase includes dense layer 340, batch normalization layer 345, and dropout layer 350. An input layer 305 and output task 355 (for CV) are also shown.

Input layer 305 may provide a variety of inputs for the model. These inputs can include past transactions for an electronic payment transaction service such as that provided by PayPal™ or other service providers. During training, inputs may be put into a neural network many, many times to boost accuracy and obtain a well-functioning model.

Dense layers 310, 325, and 340 include a plurality of neurons. Each neuron may perform one or more mathematical operations on its inputs, and produce an output. Batch normalization layers 315, 330, and 345 may adjust data to fit within particular parameters so that smoother processing can be obtained. Dropout layers 320, 335, and 350 may select certain data for dropout and/or replacement with randomized data (e.g. noise) to prevent overfitting. Note that various aspects described above with respect to FIG. 3 may also apply to other models using neural networks discussed herein.

Figure 4:
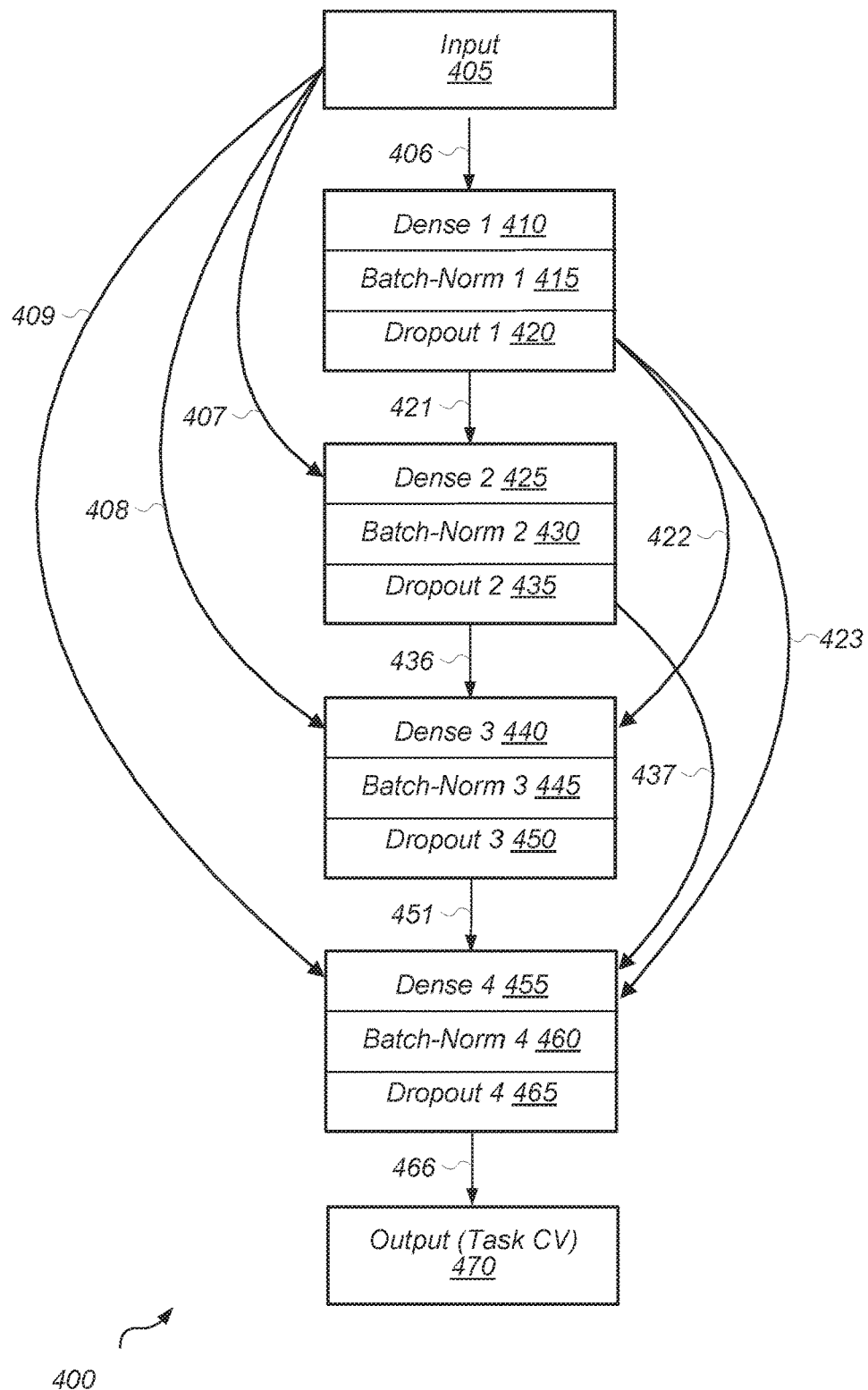
FIG. 4 is a diagram of an architecture related to densely connected neural networks according to some embodiments.

Turning to FIG. 4, a diagram of one embodiment of a densely connected neural network 400 is shown. The architecture for this densely connected neural network is broadly applicable, and need not be used only to calculate CV. In various embodiments, other quantities can be calculated for the model—indeed, this architecture can be used for any appropriate modeling task.

One of the characteristics of a densely connected neural network, in various embodiments, is that outputs of each prior layer are forwarded to each and every subsequent layer. This contrasts with other neural network architectures, such as that of FIG. 3, in which layers may simply be serially connected to one another (e.g. layer 1 outputs to layer 2 which outputs to layer 3, though layer 1 does not output to layer 3 directly). By forwarding inputs to each and every subsequent layer, data visibility persists at a higher level across the neural network, in various embodiments, though greater complexity can also arise due to greater quantities of inputs being handled at deeper layers in the network.

Note that forwarding output to a deeper layer (i.e. not just an immediately subsequent layer) in a neural network does not necessarily make a densely connected neural network. As noted above, a feature of densely connected neural network in various embodiments is that all possibly output forwarding is performed—that is, a $6^{th}$ level layer would get inputs from at least the five previous layers, for example.

In the embodiment of FIG. 4, there are four components, each including a dense layer, a batch normalization layer, and a dropout layer. As depicted, these components include dense layers 410, 425, 440, and 455, batch normalization layers 415, 430, 445, and 460, and dropout layers 420, 435, 450, and 465.

Input layer 405 gives data to the first component via communication flow 406 as shown. Unlike other neural networks, however, input layer 405 also gives data via communication flows 407, 408, and 409 to the second, third, and fourth components of the neural network. Similarly, the first component provides output data to the second, third and fourth components via communication flows 421, 422, and 423. The second component provides output data to the third and fourth components via communication flows 436 and 437. The third component provides output data to the fourth component via communication flow 451. Meanwhile the fourth component outputs to output task CV 470.

Neural network 400 can be optimized on an output task, such as CV, using historical data in various embodiments. For example, neural network 400 (which is densely connected) can be trained using past transaction data for users and/or other data (e.g. cost data, fraud loss data, revenues data, etc.). Training the model can be performed, in the case of CV, by taking known user-related data and running it through neural network 400. Predictions from the neural network 400 can then be compared to actual data (e.g., the network predicted a CV for $110 for a user over a 12-month historical period, while actual CV for that customer was $100, indicating a 10% error). Adjustments can then be made to the different components of the neural network (e.g., to neurons within dense layer 410, 425, etc.) to see if tweaking the model results in better accuracy (e.g. did an adjustment get the network closer to predicting the historical actual $100 CV for the customer). This process can be repeated many times, for different customers (with potentially millions or more trials) to tweak the model to produce good results for a large population. Neuron adjustments can include changing weighting and/or mathematical functions at those neurons to produce different results. E.g., for a layer with 4 neurons, weightings might start at 0.25 each, but be shifted in different trials to other values (e.g. 0.4 for two neurons and 0.1 for two others, etc., with many different variations obviously possible). Mathematical functions and/or parameters within the calculations made by the neurons can also be adjusted in various ways.

Input selection operations can also be performed at dense layers such as 410, 425, 440, and 455. This may be particularly useful because in a densely connected neural network, in some instances, successive layers may receive large numbers of inputs that need to be reduced appropriately for the number of neurons at that layer. Consider, for example, if dense layers 410, 425, 440, and 455 had four neurons each (with each neuron producing one output). In this example, dense layer 455 (the deepest layer shown) would be receiving outputs from twelve different neurons (in addition to input layer 405), from communication pathways 423, 437, and 451. These outputs can be operationally combined at dense layer 455 prior to processing by that layer's neurons—for example, the inputs could be simply and linearly combined (e.g., each neuron output on pathways 423, 437, and 451 could simply be averaged with one another). Other operators can also be used, however, such as addition, subtraction, multiplication, or more complex functions as well, and weightings can also be varied (e.g. weighting for an immediately preceding layer could be higher than a more distant preceding layer). Input selection operations can also be tweaked and adjusted as part of the process of training neural network 400 (e.g., as the model is trained, operations that affect the way inputs are sent to deeper layers in the network can be changed—weightings can be adjusted, a multiplication operation can be turned into a subtraction operation, order of operands and/or operators can be shifted, etc.).

Once neural network 400 is trained, it can then be used to predict CV (or another quantity) for various input data. In some cases, newer users of a service provider can have their CV predicted even if they have little or no transaction history. Input data 405 for neural network 400, for example, can include not just transaction history, but also various profile data about a user. Someone who has only recently joined PayPal™, for example, may still provide many pieces of information about themselves, such as mailing address, country of residence, linked funding sources (debit or credit card, checking account, etc.), an email address, and device information (e.g. what model of computer or smartphone the user has, whether they have connected to PayPal.com from different cities, network information such as IP addresses used to login, additional hardware device information like screen size and other fixed and/or changeable aspects of the device, etc.). Such information can also be used to train neural network 400, which in some circumstances can allow prediction of CV even for users who do not have much transaction history. (E.g., the neural network could have users with very little or no history during training, but then optimize based on known data for those users later—that is, the training could take the user's data as it existed shortly after sign up, for example, and then later compare predicted CV to what that (at the time) new customer did in a following time period such as 3 or 12 months).

Figure 4B:
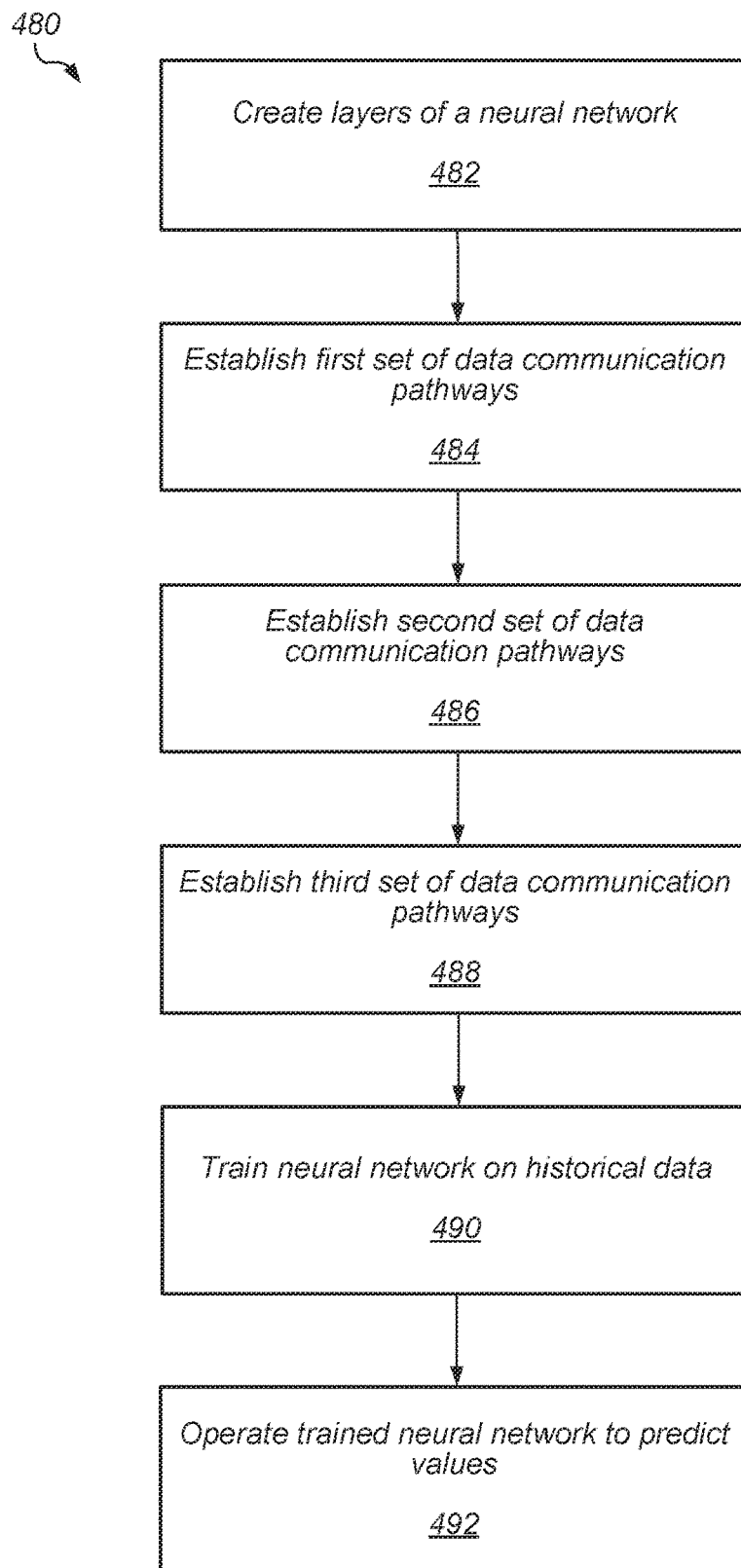
FIG. 4B is a flow diagram of a method that relates to densely connected neural networks according to some embodiments.

Turning now to FIG. 4B, a flowchart of one embodiment of a method 480 is shown. This method relates to neural networks such as that described above relative to FIG. 4 (as well as elsewhere herein).

Operations described relative to FIG. 4B may be performed, in various embodiments, by any suitable computer system and/or combination of computer systems, including analysis system 120 and/or transaction system 160. For convenience and ease of explanation, however, operations described below will simply be discussed relative to analysis system 120. Further, various elements of operations discussed below may be modified, omitted, and/or used in a different manner or different order than that indicated. Thus, in some embodiments, analysis system 120 may perform one or more aspects described below, while transaction system 160 (or another system) might perform one or more other aspects.

In operation 482, layers of a neural network are created by analysis system 120, in some embodiments. This operation may include creating first, second, third, and fourth layers of a neural network, each layer including one or more neurons (e.g., such as shown in FIG. 4). Greater or lesser numbers of layers may be created in various embodiments.

In operation 484, a first set of data communication pathways are established by analysis system 120, in some embodiments. This operation may include creating pathways leading directly from the outputs of neurons of a first layer to second, third, and fourth layers in various embodiments. Note that the term "directly" is used here to indicate that these inputs are not intercepted by another layer of the neural network, e.g., an input from a first layer that is sent to a second layer and then processed would not be said to be sent "directly" to a third layer if the third layer simply receives the processed output from the second layer. Further, the term "directly" in this context also does not preclude processing of outputs of neurons by, e.g., a batch normalization component or a dropout component prior to forwarding the outputs, nor does it preclude performing input selection operations as discussed above.

Similarly, in operation 486, a second set of data communication pathways are established by analysis system 120, in some embodiments. This operation may include creating pathways leading directly from outputs of neurons of the second layer to third and fourth layers. In operation 488, a third set of data communication pathways are established by analysis system 120, in some embodiments. This operation includes establishing communication pathways leading directly from outputs of the neurons of a third layer to a fourth layer.

In operation 490, the neural network is trained by analysis system 120, in some embodiments. Training may include using historical data to optimize the neural network to predict a particular quantity, such as CV.

In operation 492, the trained neural network is operated to predict values, in some embodiments. For example, operation 492 can include predicting CV for one or more users of an electronic payment transaction service provider. Note particularly that while various operations described in method 480 can be performed by systems other than analysis system 120, operation 492 may often be performed by such a different system. It may be the case, for example, that building and training a neural network model is performed by one system, while another system uses the completed model to make predictions.

After values such as CV are predicted, those values may also be stored in a database for use. For example, a customer record might be updated with a predicted CV value that could then be used for certain operations, such as risk assessment for a user making an electronic payment transaction, or for handling a customer service query from a user.

Unified Model for Multiple Customer Value Variable Prediction

Figure 5:
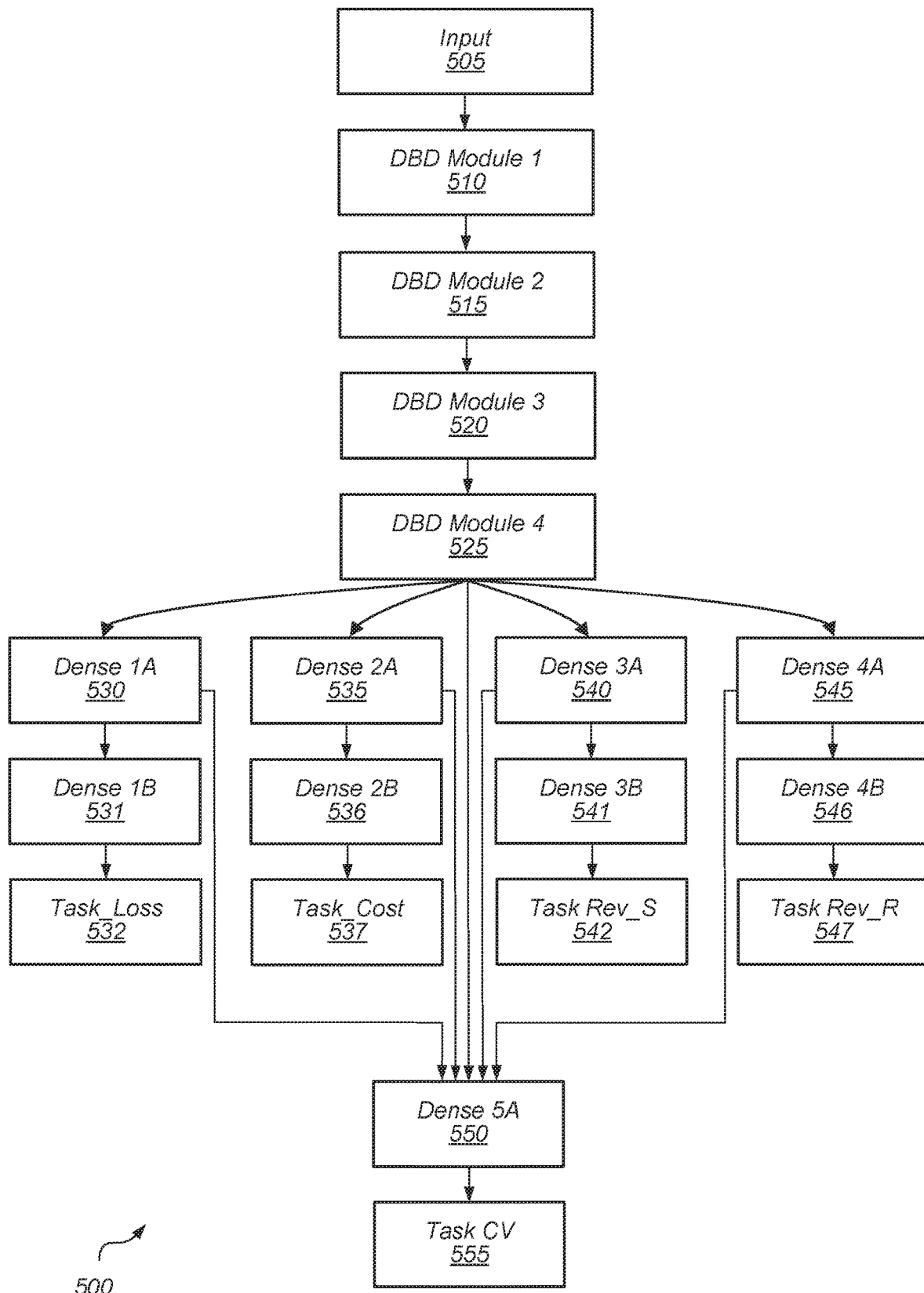
FIG. 5 is a diagram of an architecture related to a unified model for predicting customer value along with sub-components of customer value, according to some embodiments.

Turning to FIG. 5, a diagram is shown of one embodiment of a unified model 500 for predicting customer value (CV) and component pieces of customer value such as cost, loss, revenue derived from a user sending money (Rev_S), and revenue derived from a user receiving money (Rev_R). This unified model allows simultaneous calculation from the same model for not only an overall objective (CV) but also calculations for related sub-variables (cost, loss, Rev_S, Rev_R) that are related components of the overall objective.

In unified model 500, input is first produced from input layer 505. This input can include transaction data and/or user profile data, for example. This input data is then put into a first series of neural network modules—in the embodiment shown, these are DBD modules 510, 515, 520, and 525.

In the present example, these DBD modules are organized similarly to FIG. 4, where there is a dense layer, a batch normalization layer, and a dropout layer. These modules may also be densely connected as in the example of FIG. 4. However, a densely connected neural network is not required and different architectures can be used in various embodiments.

Once the first series of neural network modules (e.g. 510, 515, 520, 525) has finished its calculations, output from that series is then distributed to a plurality of variable sub-task neural network modules. In this example, the sub-task neural network modules comprise a first sub-task module including dense layers 530 and 531, a second sub-task module including dense layers 535 and 536, a third sub-task module including dense layers 540 and 541, and a fourth sub-task module including dense layers 545 and 546. These modules are each respectively designed to generate outputs for the sub-variables loss, cost, Rev_S, and Rev_R, as indicated by tasks 532, 537, 542, and 547.

In the example given, the first sub-task module has two dense layers 530 and 531. Output from the dense layer 530 is forwarded to a final task neural network module that includes dense layer 550 (for calculating CV). From a high-level perspective, dense layer 530 can be considered as doing work both to help calculate loss (532) and to calculate customer value (555). However, the second layer 531 of the two dense layers is only used for calculating the variable sub-task loss—hence, output from dense layer 531 is only used for the loss calculation task 532 (and is not forwarded to dense layer 550 for calculating CV). The other sub-task modules work similarly—cost, Rev_R, and Rev_S are all related component sub-variables for CV, so work can be performed for calculating those variables while at the same time also doing work to calculate the overall task of CV.

Figure 5B:
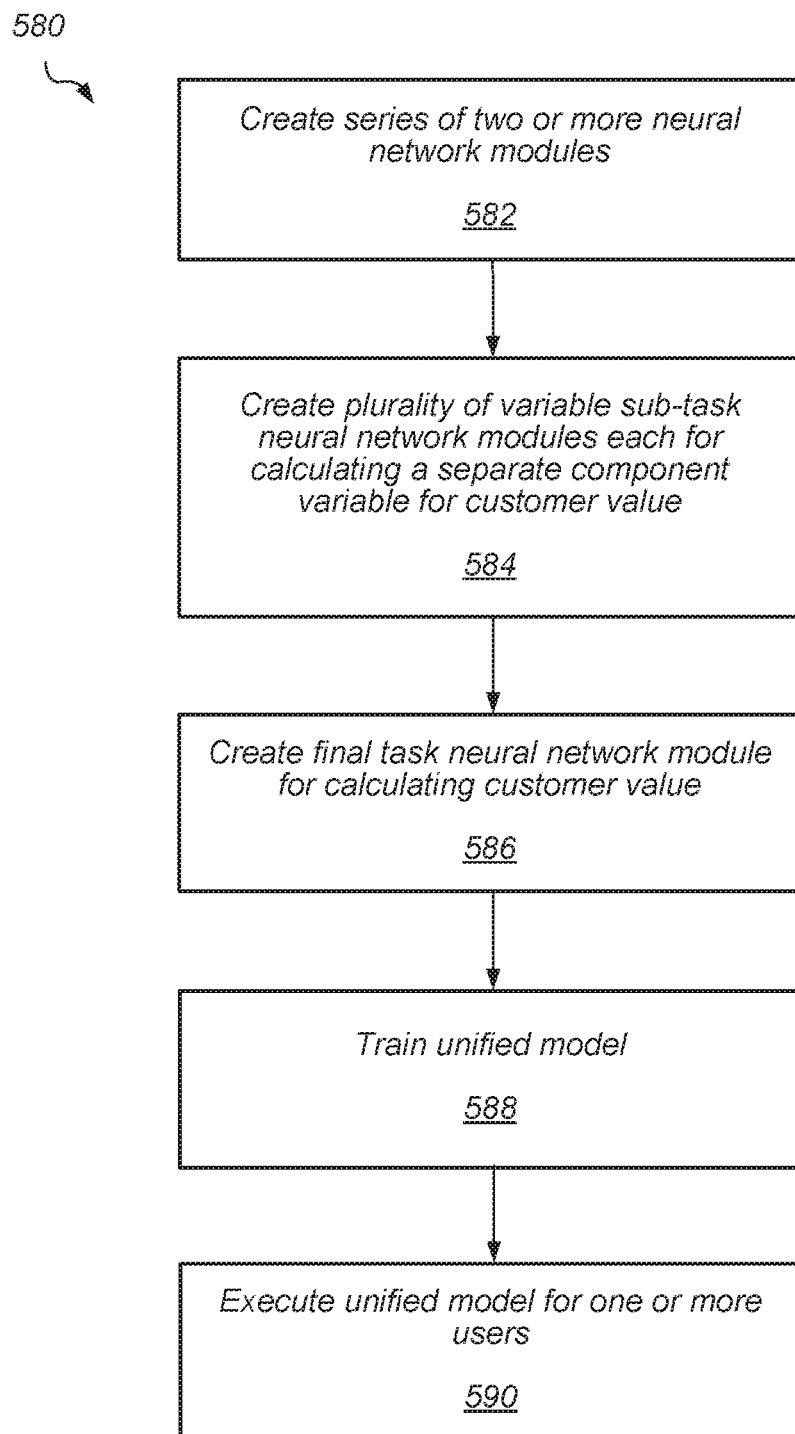
FIG. 5B is a flow diagram of a method that relates to the unified model of FIG. 5, according to some embodiments.

Turning to FIG. 5B, a flowchart of one embodiment of a method 580 is shown. This method relates to a unified model such as that described above relative to FIG. 5 (as well as other techniques and structures described elsewhere herein). Thus, in one embodiment, unified model 500 is created as a product of executing method 580.

Operations described relative to FIG. 5B may be performed, in various embodiments, by any suitable computer system and/or combination of computer systems, including analysis system 120 and/or transaction system 160. For convenience and ease of explanation, however, operations described below will simply be discussed relative to analysis system 120. Further, various elements of operations discussed below may be modified, omitted, and/or used in a different manner or different order than that indicated. Thus, in some embodiments, analysis system 120 may perform one or more aspects described below, while transaction system 160 (or another system) might perform one or more other aspects.

In operation 582, a series of two or more neural network modules is created by analysis system 120, in some embodiments. In some embodiments, each of these modules includes a dense layer of neurons in which each of the neurons is connected to all of the neurons for an immediately preceding neural network module. For example, the neurons of DBD module 525 may all be connected to the neurons of DBD module 520, which are all connected to the neurons of DBD module 515, which are all connected to the neurons of DBD module 510. (The neurons of DBD module 505 are also connected to inputs from input layer 505, though this input layer itself does not have neurons in various embodiments.)

In operation 584, a plurality of variable sub-task neural network modules are created by analysis system 120, in some embodiments. Each of the variable sub-task neural network modules, in various embodiments, is connected to an output of the last of the series of two or more neural network modules (such as DBD module 525), where each of the variable sub-task neural network modules is configured to calculate a separate one of a plurality of component variables for predicted customer value. As noted above, for example, a loss variable sub-task neural network module including dense layers 530 and 531 is connected to the output of DBD module 525, as are other sub-task neural network modules for cost, Rev_S, and Rev_R.

In operation 586, a final task neural network module is created for calculating customer value by analysis system 120, in some embodiments. This final task neural network module, in various embodiments, is connected to the output of the last of the series of two or more neural network modules and is also connected to an intermediate output from each of the plurality of variable sub-task neural network modules. In the example of FIG. 5, a final task neural network module includes dense layer 550, which is connected to intermediate outputs from dense layers 530, 535, 540, and 545. (Note that in this example, further dense layers that are closest to the immediate sub-task variable calculations, e.g. layers 531, 536, 541, and 546, are not connected to provide output to dense layer 550, as these further dense layers are simply optimized for calculating loss, cost, Rev_S, and Rev_R.)

In operation 588, a unified model (as created in operations above) is trained by analysis system 120, in some embodiments. Training may be as described above, with various neurons, input selection operations, and/or other adjustments being made to optimize the unified model. Note that different kinds of optimization can be performed—for example, the model could be initially optimized for CV and also separately optimized for the sub-task variables of loss, cost, Rev_R, and Rev_S. This is possible because of the separate dense layers 531, 536, 541, and 546 in various embodiments—these dense layers can be adjusted and tweaked for their sub-tasks without affecting the calculations of dense layer 550 for CV, as those deeper layers do not provide output to the dense layer 550.

Accordingly, a unified model created as a product of method 580 may be configured to predict, using particular input data pertaining to a particular customer, each of a plurality of component variables for predicted customer value and also separately predict total customer value for that customer. The trained model, for example, can give not only a CV prediction for a given customer based on his or her transaction history data and/or profile data, but can separately predict individual component variables like cost, loss, etc. Having these variables separately calculated can be useful in making certain predictions. As one example, a marketing and/or fraud team may wish to identify customer cohorts that have a low CV, but have high Rev_R and/or Rev_S and high loss. Targeted actions, offers, and/or targeted communications could be sent or performed based on these identifications (or other identifications, in other contexts).

An additional benefit of a unified model as described above is a reduction in error rates. If, for example, cost, loss, Rev_R, and Rev_S were all calculated with their own separate models and then combined to provide a CV estimate model, their errors would be additive—e.g. the error from using four separate models is greater than simply using a unified model. The techniques above allow for one unified model to calculate not just CV but also its components.

In operation 590, the unified model is executed for one or more users by analysis system 120, in some embodiments. Note particularly that while various operations described in method 580 can be performed by systems other than analysis system 120, operation 590 may often be performed by such a different system. It may be the case, for example, that building and/or training a unified neural network model is performed by one system, while another system uses the completed model to make predictions. Reporting data can be generated for predicting CV for multiple customers (along with cost, loss, Rev_R, Rev_S) and can be stored in a database and/or transmitted as reporting metrics.

Structured Convolutional Neural Networks

Techniques described above, in various embodiments, are applied on engineered features rather than raw transaction data and/or profile data for an electronic service provider. Engineered features, for example, may include human selected aspects of raw data, and may also include operations on raw data that result in some data being lost or obscured.

As one simple example of a possible engineered feature, consider a transaction record format that includes (A) IP address for which an electronic payment transaction is being conducted, (B) user destination shipping address for an order of something, and (C) type of currency being provided by user to pay for transaction (e.g. USD). Thus, these three different pieces of information might be present in the raw data. For purposes of modeling, however, this information might be combined into an engineered feature called "Country for Transaction." Rules can be used reconcile the above data into one single piece of information (e.g., if at least two out of three of IP, shipping address, and currency indicate the same country such as the United States, then assign that country to the engineered feature). Many other examples of engineered features are possible. By using such engineered features for machine learning, parameters can be simplified—but as noted, the cost of this simplification can be loss of access to certain portions of the raw underlying data, in various embodiments.

Convolutional neural networks (CNNs) are sometimes used in image recognition applications, such as identifying whether or not a human face is in an image. Typically, CNNs are not necessarily used for business data applications. However, as described below, CNNS may be adapted for certain business use cases. Note that these adaptations represent unique ways of structuring and processing data using advanced technical algorithms and machine learning techniques, and are not simply "business methods" of routinely processing data, as will be apparent from the following discussions.

Figure 6:
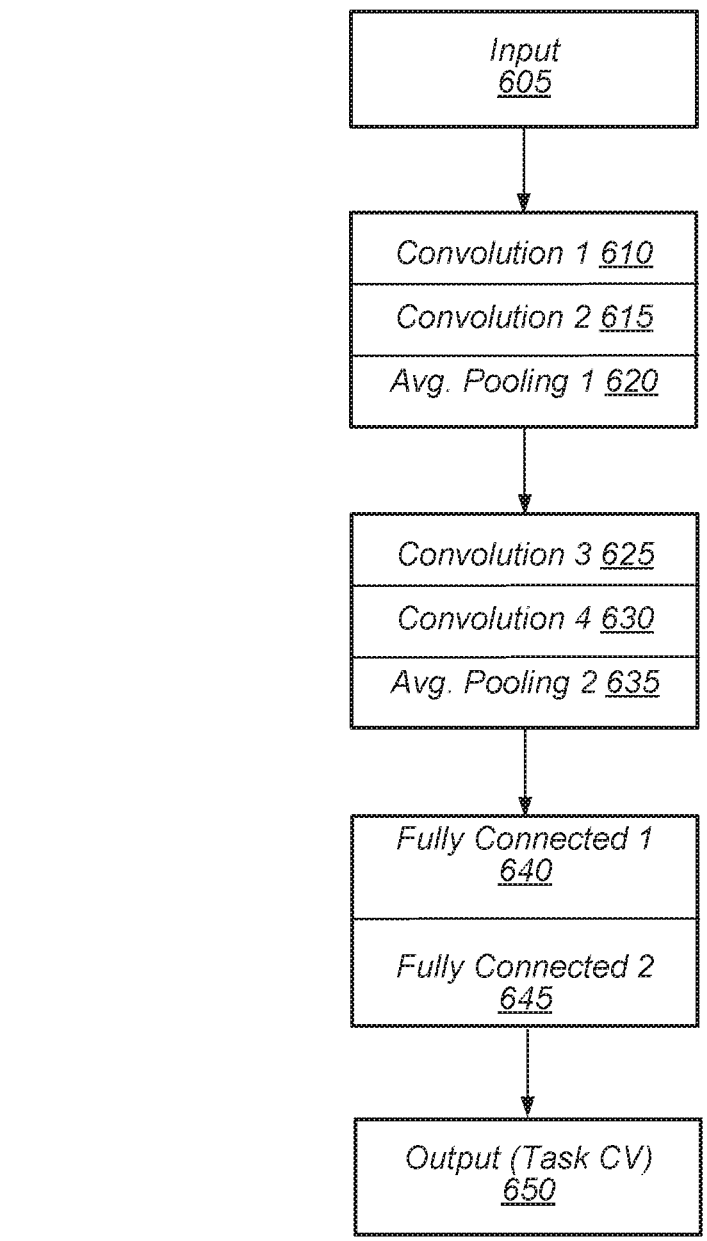
FIG. 6 is a diagram of an architecture related to a structured convolutional neural network (SCNN), according to some embodiments.

Turning to FIG. 6, a diagram is shown of one embodiment of a structured convolutional neural network (SCNN) 600. In this example, input layer 605 is connected to a first convolutional module (comprising convolution layers 610 and 615, and average pooling layer 620). The first convolutional module is in turn connected to a second convolutional module comprising convolution layers 625 and 630, and average pooling layer 635. The second convolutional module is in turn connected to a fully connected module comprising fully connected layers 640 and 645. The fully connected module is lastly connected to output task 650 (for customer value, or CV).

Input layer 605, in this example, may feature raw transaction data from an electronic payment transaction service provider (or another type of service provider). This transaction data may, for example, include values for many possible different features. For example, there may be 20, 40, 80, 100, 200, or any other number (higher or lower) of possible features. As discussed above, this could include values like IP address of the user at the time of a transaction, what type of device the user was logged into (smartphone, desktop, laptop, tablet, etc.), make and model of such device, amount of transaction, type of funding instrument such as credit card or account balance or debit card, currency type, home address, home country, phone number for account, available demographic data like age or gender of user, identity of another user from whom currency was received or transferred to (and if that other user was a merchant with an established business, type of the business, type of good purchased, etc.). Many additional values may be present for a transaction in addition to those explicitly mentioned above. In various embodiments, raw transaction data is used rather than engineered feature data.

Figure 6B:
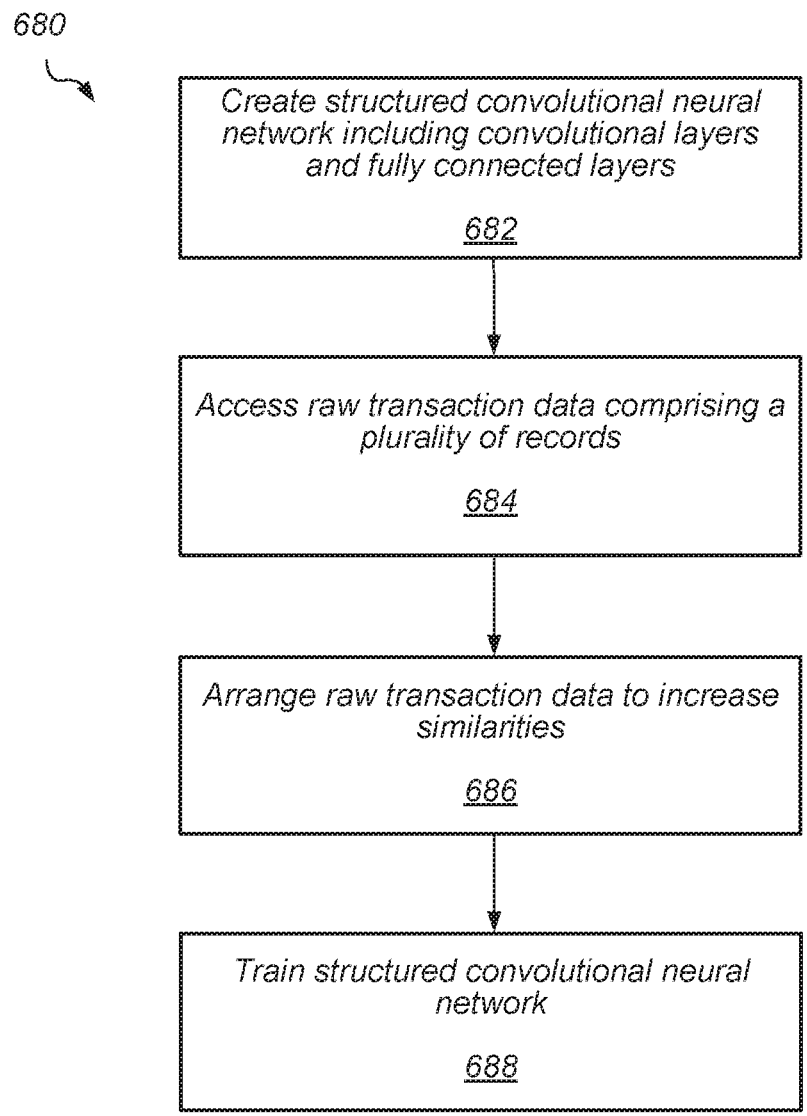
FIG. 6B is a flow diagram of a method that relates to the SCNN of FIG. 6, according to some embodiments.

Turning to FIG. 6B, a flowchart of one embodiment of a method 680 is shown. This method relates to a structured convolutional neural network (SCNN) model such as that described above relative to FIG. 6 (as well as other techniques and structures described elsewhere herein). Thus, in various embodiment, SCNN model 600 is created and/or used as a product of performing one or more aspects of method 680.

Operations described relative to FIG. 6B may be performed, in various embodiments, by any suitable computer system and/or combination of computer systems, including analysis system 120 and/or transaction system 160. For convenience and ease of explanation, however, operations described below will simply be discussed relative to analysis system 120. Further, various elements of operations discussed below may be modified, omitted, and/or used in a different manner or different order than that indicated. Thus, in some embodiments, analysis system 120 may perform one or more aspects described below, while transaction system 160 (or another system) might perform one or more other aspects.

In operation 682, a structured convolutional network (SCNN) is created by analysis system 120, in some embodiments. In one embodiment, this operation includes creating an input layer, a first convolutional module connected to the input layer, a second convolutional module connected to the first convolutional module, and a fully connected module connected to the second convolutional module.

The first convolutional module may comprise a first convolutional layer (e.g. layer 610), a second convolutional layer (e.g. layer 615), and first average pooling layer (e.g. layer 620). The second convolutional module may comprise a third convolutional layer (e.g. layer 625), a fourth convolutional layer (e.g. layer 630), and a second average pooling layer (e.g. layer 635). The fully connected module may comprise a first fully connected layer (e.g. layer 640) and a second fully connected layer (e.g. layer 645).

Convolutional layers (e.g. 610, 615, 625, 630) may be configured to apply one or more convolutions to the input data. A pattern of limited size may be applied to the data, for example, with resulting weights being given to the underlying data. The pattern can then be re-applied to other areas of the data until most or all of the data has been compared to the pattern.

Average pooling layers (e.g. 620 and 635) may be configured to perform pooling operations on various data produced from convolutional layers. (Note that in some embodiments, techniques other than average pooling may be used, such as maximum pooling). Pooling may allow for effective down-sampling in various embodiments, reducing the size of data being operated on.

Fully connected layers (e.g. 640 and 645) may include a plurality of neurons in each layer that are each connected to all the neurons in the previous layer (e.g. as discussed above relative to various embodiments). This fully connected layer can allow for final calculations to be performed when optimizing for a quantity such as customer value.

In operation 684, raw transaction data comprising a plurality of records is accessed by analysis system 120, in some embodiments. The records may each have a plurality of fields containing a respective feature value from a set of features. Feature set data, for example, can include any information collected about a transaction from a service provider such as PayPal™, a third-party intermediary, a merchant, or another party, in various embodiments. Note of course that such information collection will comply with applicable privacy rules and regulations in various jurisdictions as required, in various embodiments.

In operation 686, the raw transaction data is arranged by analysis system 120, in some embodiments. The raw transaction data may be arranged such that at least one of the plurality of fields (containing feature data) is re-ordered relative to other fields to increase similarity of raw data between adjacent fields of the plurality of fields. By re-ordering the data to obtain greater degrees of similarity between adjacent fields, the resulting rearranged data can get better results when convolutional neural network techniques are applied. The arrangement of data can be performed manually or automatically in various embodiments.

Thus, input layer 505 raw transaction data may be arranged in various embodiments in such a way as to better enable the usage of a CNN. As noted above, CNNs can be used to perform image recognition techniques. CNNs can be advantageous for image recognition application because of the way that pixels frequently have a relationship to other neighboring pixels. For example, in a natural scene image, most of the pixels belonging to an oak tree may be located immediately adjacent to other pixels also belonging to the same oak tree. Likewise, for other objects in the image as well.

Data may be arranged as a one-dimensional vector (e.g. multiple transaction records essentially concatenated together) in some embodiments, or as a two-dimensional array in other embodiments (e.g. as an array that is M transactions long and N transaction features wide). Thus, in various embodiments, a SCNN may include one-dimensional data with one-dimensional convolutions, two-dimensional data with two-dimensional convolutions, or two-dimensional data with three-dimensional convolutions.

In business use cases, individual items of data may have little or no relationship to neighboring data. Transactional and/or other databases are frequently organized with no regard being paid to how one type of recorded data is similar (or dissimilar) to another type of recorded data. E.g., for a transaction having 50 different feature values, these values may be arranged in the columns of a database such that the value in column 1 has little or no relationship to the value in column 2, which may have little or no relationship to the value in column 3. Accordingly, CNN techniques may be fairly ineffective for such data.

Business data can be arranged manually or automatically, however, such that adjacent data are made to have greater correlations with one another. For example, consider a transaction record that includes a user's postal code (e.g. ZIP code) associated with a credit card, a phone number area code for the user's home phone number, and state or province for the user's shipping address for a particular order from a merchant. These data might comprise postal ZIP code 78729, U.S. area code 512, and Texas as the user's shipping address state. Depending on the organization of the database, columns for these data may be located in various positions nowhere particularly close to one other. However, there may be a high degree of correlation between these data. Thus, for purposes of an SCNN, input data can be rearranged such that these data are placed adjacent to one another in fields (e.g. columns) of a transaction record.

When automatically rearranging the transaction data, a set of records can be analyzed first to determine correlations between the different fields of the records. For example, by analyzing different records, it might be seen that a particular value for field #24 has a predictive value of 0.45 for another particular value being present in field #73 of the same record. Using this data, a specification for rearranging the data can be automatically generated in some embodiments.

In operation 688, analysis system 120 trains the SCNN. This training may include repeatedly feeding the raw transaction data into the SCNN, in some embodiments, and compares output of the SCNN to known results associated with the raw transaction data, and makes adjustments to a plurality of weighting parameters for the SCNN based on results of the comparing.

When considering user transaction data, particularly in big data systems, the sheer size of the number of records involved can make traditional neural network techniques extremely complex and computationally expensive to deliver an adequate solution (e.g. with fully connected networks M×N parameters may be needed). In a convolutional technique, however, only a small number of weighted parameters may be used (e.g. w1, w2, w3). Using this smaller number of parameters can avoid overfitting issues and leads to greater scalability in some embodiments. These weighting parameters can be adjusted during training of the SCNN, changing the ultimate output of the network based on the data that is fed in. When optimal or near-optimal weighting values are found, for example, then the trained network can be used on other data for which no historical result is known to make predictions for CV or another quantity.

Joint Combined Model

In some embodiments, a densely connected neural network (e.g. as in FIG. 4) and a structured convolutional neural network (e.g. as in FIG. 6) can be used in combined joint model that may achieve even greater accuracy for predicting CV (or another quantity) in various embodiments. Such a joint combined model can also operate as in FIG. 5 to predict multiple sub-variables for CV such as loss, cost, Rev_S, and Rev_R. For example, a first set of input data may be fed into a densely connected neural network model (e.g. as in FIG. 4) which is then trained using that data. Meanwhile, a second set of input data may be fed into an SCNN (e.g. as in FIG. 6), which is then likewise trained. Output from the densely connected neural network can then be distributed to five different task components (e.g. loss, cost, Rev_S, Rev_R, and CV) as in FIG. 5. Meanwhile, output from the SCNN can also be distributed to the same five different task components. Thus, a first dense layer for calculating loss may receive one set of inputs from the densely connected neural network but also receive another set of inputs from the SCNN. Likewise, first dense layers for calculating the other components may receive these joint inputs. Similar to FIG. 5, intermediate outputs from the first dense layers for loss, cost, Rev_R, and Rev_S can be forwarded to a CV calculation component, while second dense layers perform final stage optimizations for loss, cost, Rev_R, and Rev_S. Thus, the joint combined model may be able to take advantages of the SCNN and the densely connected neural network in a single model without increasing error ranges that might be caused from using multiple models. Accuracy may also be improved.

Computer-Readable Medium

Figure 7:
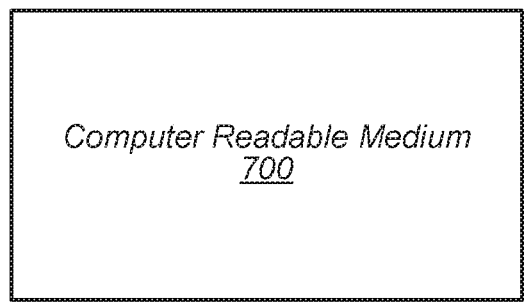
FIG. 7 is a diagram of a computer readable medium, according to some embodiments.

Turning to FIG. 7, a block diagram of one embodiment of a computer-readable medium 700 is shown. This computer-readable medium may store instructions corresponding to the operations of any of the preceding figures and/or any techniques described herein, in various embodiments. Thus, in one embodiment, instructions corresponding to analysis system 120 may be stored on computer-readable medium 700.

Note that more generally, program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, Python, or any other scripting language, such as VBScript. Note that as used herein, the term "computer-readable medium" refers to a non-transitory computer readable medium.

Computer System

Figure 8:
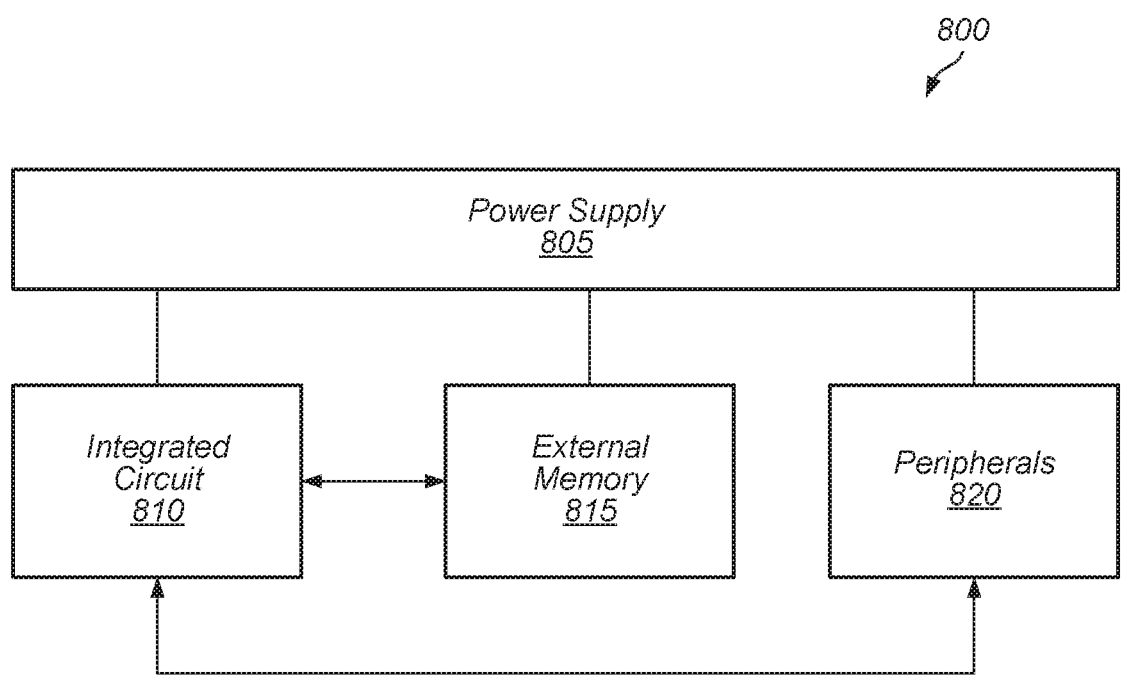
FIG. 8 is a block diagram of a system, according to some embodiments.

In FIG. 8, one embodiment of a computer system 800 is illustrated. Various embodiments of this system may be analysis system 120, transaction system 160, or any other computer system as discussed above and herein.

In the illustrated embodiment, system 800 includes at least one instance of an integrated circuit (processor) 810 coupled to an external memory 815. The external memory 815 may form a main memory subsystem in one embodiment. The integrated circuit 810 is coupled to one or more peripherals 820 and the external memory 815. A power supply 805 is also provided which supplies one or more supply voltages to the integrated circuit 810 as well as one or more supply voltages to the memory 815 and/or the peripherals 820. In some embodiments, more than one instance of the integrated circuit 810 may be included (and more than one external memory 815 may be included as well).

The memory 815 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 810 in a chip-on-chip configuration, a package-on-package configuration, or a multi-chip module configuration.

The peripherals 820 may include any desired circuitry, depending on the type of system 800. For example, in one embodiment, the system 800 may be a mobile device (e.g. personal digital assistant (PDA), smart phone, etc.) and the peripherals 820 may include devices for various types of wireless communication, such as wife, Bluetooth, cellular, global positioning system, etc. Peripherals 820 may include one or more network access cards. The peripherals 820 may also include additional storage, including RAM storage, solid state storage, or disk storage. The peripherals 820 may include user interface devices such as a display screen, including touch display screens or multitouch display screens, keyboard or other input devices, microphones, speakers, etc. In other embodiments, the system 800 may be any type of computing system (e.g. desktop personal computer, server, laptop, workstation, net top etc.). Peripherals 820 may thus include any networking or communication devices necessary to interface two computer systems.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for training a structured convolutional neural network (SCNN) usable with raw transaction data, comprising:
creating the SCNN by a computer system, including creating an input layer, a first convolutional module directly connected to the input layer, a second convolutional module directly connected to the first convolutional module, and a fully connected module directly connected to the second convolutional module,
wherein the first convolutional module comprises a first convolutional layer, a second convolutional layer, and a first average pooling layer,
wherein the second convolutional module comprises a third convolutional layer, a fourth convolutional layer, and a second average pooling layer,
wherein the fully connected module comprises a first fully connected layer and a second fully connected layer;
accessing, by the computer system, raw transaction data comprising a plurality of records each having a plurality of fields containing a respective feature value from a set of features;
arranging the raw transaction data such that at least one of the plurality of fields is re-ordered to increase a similarity of raw data between adjacent fields of the plurality of fields;
training the SCNN, comprising:
repeatedly feeding the raw transaction data into the SCNN, comparing outputs of the SCNN to known results associated with the raw transaction data, and making adjustments to a plurality of weighting parameters for the SCNN based on results of the comparing; and
assessing a risk for an electronic payment transaction requested by a user based on an output of the SCNN for data from the user.

2. The method of claim 1, further comprising predicting, for a plurality of users, a customer value for a particular future time period using the SCNN.

3. The method of claim 1, wherein arranging the raw transaction data is performed manually.

4. The method of claim 1, wherein arranging the raw transaction data is performed according to automatically created specifications based on statistical observations of correlation between different feature values in the plurality of records.

5. The method of claim 1, wherein the first, second, third, and fourth convolutional layers each use at least three weighting parameters to optimize results.

6. The method of claim 1, wherein the raw transaction data includes fields for a transaction amount, a currency type, and a network address associated with a user.

7. The method of claim 1, wherein the first average pooling layer is configured to use average values from a plurality of neurons at the second convolutional layer.

8. The method of claim 1, wherein the SCNN is trained to optimize predicted customer values for customers of an electronic transaction payment service provider.

9. The method of claim 1, further comprising updating the SCNN based on a newly acquired plurality of records that are more recent than the plurality of records.

10. The method of claim 1, wherein the computer system comprises one or more processors and one or more memories connected via a network to a database associated with an electronic service provider at which the plurality of records are stored.

11. A computer system, comprising:
a processor; and
a computer-readable medium having stored thereon instructions that are executable to cause the computer system to perform operations comprising:
accessing a structured convolutional neural network (SCNN) that includes an input layer, a first convolutional module connected to the input layer, a second convolutional module connected to the first convolutional module, and a fully connected module directly connected to the second convolutional module,
wherein the first convolutional module comprises a first convolutional layer, a second convolutional layer, and a first average pooling layer,
wherein the second convolutional module comprises a third convolutional layer, a fourth convolutional layer, and a second average pooling layer,
wherein the fully connected module comprises a first fully connected layer and a second fully connected layer;
accessing raw transaction data comprising a plurality of records each having a plurality of fields containing a respective feature value from a set of features;
arranging the raw transaction data such that at least one of the plurality of fields is re-ordered to increase a similarity of raw data between adjacent fields of the plurality of fields;
training the SCNN, comprising:
repeatedly feeding the raw transaction data into the SCNN, comparing outputs of the SCNN to known results associated with the raw transaction data, and making adjustments to a plurality of weighting parameters for the SCNN based on results of the comparing; and
assessing a risk for an electronic payment transaction requested by a user based on an output of the SCNN from data for the user.

12. The computer system of claim 11, wherein arranging the raw transaction data is performed according to automatically created specifications based on statistical observations of correlations between different feature values in the plurality of records.

13. The computer system of claim 11, wherein the first, second, third, and fourth convolutional layers each use at least three weighting parameters to optimize results.

14. The computer system of claim 11, wherein the raw transaction data includes fields for a home address country, a home address postal code, and a network address associated with a user.

15. The computer system of claim 11, wherein the first average pooling layer is configured to use average values from a plurality of neurons at the second convolutional layer.

16. A non-transitory computer-readable medium having stored thereon instructions that are executable by a computer system to cause the computer system to perform operations comprising:
accessing a structured convolutional neural network (SCNN) that includes an input layer, a first convolutional module connected to the input layer, a second convolutional module directly connected to the first convolutional module, and a fully connected module connected to the second convolutional module, wherein the first convolutional module comprises a first convolutional layer, a second convolutional layer, and a first average pooling layer, wherein the second convolutional module comprises a third convolutional layer, a fourth convolutional layer, and a second average pooling layer, wherein the fully connected module comprises a first fully connected layer and a second fully connected layer;

accessing raw transaction data comprising a plurality of records each having a plurality of fields containing a respective feature value from a set of features;

arranging the raw transaction data such that at least one of the plurality of fields is re-ordered to increase a similarity of raw data between adjacent fields of the plurality of fields;

training the SCNN, comprising:
repeatedly feeding the raw transaction data into the SCNN, comparing outputs of the SCNN to known results associated with the raw transaction data, and making adjustments to a plurality of weighting parameters for the SCNN based on results of the comparing; and assessing a risk for an electronic payment transaction requested by a user based on an output of the SCNN from data for the user.

17. The non-transitory computer-readable medium of claim 16, wherein arranging the raw transaction data is performed according to automatically created specifications based on statistical observations of correlation between different feature values in the plurality of records.

18. The non-transitory computer-readable medium of claim 16, wherein the first, second, third, and fourth convolutional layers each use at least three weighting parameters to optimize results.

19. The non-transitory computer-readable medium of claim 16, wherein the second average pooling layer is configured to use average values from a plurality of neurons at the fourth convolutional layer.

20. The non-transitory computer-readable medium of claim 16, wherein the raw transaction data includes fields for a home address country, a home address postal code, and a network address associated with a user.

* * * * *